US009219641B2

(12) United States Patent
Chiang et al.

(10) Patent No.: US 9,219,641 B2
(45) Date of Patent: *Dec. 22, 2015

(54) PERFORMING FAILOVER IN A REDUNDANCY GROUP

(71) Applicant: INTERNATIONAL BUSINESS MACHINES CORPORATION, Armonk, NY (US)

(72) Inventors: Johnson YS Chiang, Taipei (TW); Jeffrey CH Liu, Taipei (TW); Ying-Kai Wang, Taipei (TW); Hao-Ting Shih, Taipei (TW)

(73) Assignee: International Business Macines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,420

(22) Filed: Aug. 29, 2014

(65) Prior Publication Data

US 2014/0369183 A1 Dec. 18, 2014

Related U.S. Application Data

(63) Continuation of application No. 14/083,351, filed on Nov. 18, 2013.

(30) Foreign Application Priority Data

Nov. 19, 2012 (TW) .............................. 101143054 A (51) Int. Cl.
*H03M 13/00* (2006.01)
*H04L 12/24* (2006.01)
*G06F 11/20* (2006.01)

(52) U.S. Cl.
CPC ........ *H04L 41/0654* (2013.01); *G06F 11/2002* (2013.01)

(58) Field of Classification Search
CPC .......... G06F 11/2005; G06F 2201/815; H04L 45/00; H04L 69/40; H04L 45/58; H04L 45/586; H04L 43/0817; H04L 45/28; H04L 41/0654; H04L 12/2602; H04L 49/557; H04L 45/70; H04L 49/354; H04L 49/70; H04L 47/125; H04L 49/356; H04L 29/12
See application file for complete search history.

(56) References Cited

U.S. PATENT DOCUMENTS 5,473,599 A * 12/1995 Li et al. ........................ 370/219
6,148,410 A * 11/2000 Baskey et al. ................ 714/4.11

(Continued)

FOREIGN PATENT DOCUMENTS

CN        101816168 A       8/2010

OTHER PUBLICATIONS

U.S. Appl. No. 14/083,351 "Performing Failover in a Redundancy Group"; Non-final office action dated Jan. 8, 2015 (20 pg).

*Primary Examiner* — Guerrier Merant
(74) *Attorney, Agent, or Firm* — Eustace P. Isidore; Yudell Isidore PLLC (57) ABSTRACT

A method, system, and computer program product for performing failover in a redundancy group, where the redundancy group comprises a plurality of routers including an active router and a standby router, the failover being characterized by zero black hole or significantly reduced black hole conditions versus a conventional failover system. The method comprises the steps of: receiving an incoming message at a switch; sending a request of identification to the plurality of routers to identify a current active router, where the current active router represents a virtual router of the redundancy group; and in response to receiving a reply containing an identification from the current active router within a predetermined time, forwarding the incoming message to the current active router.

10 Claims, 6 Drawing Sheets

(56) References Cited

U.S. PATENT DOCUMENTS

| | | |
|---|---|---|
| 6,256,314 B1* | 7/2001 | Rodrig et al. ............... 370/401 |
| 7,055,173 B1* | 5/2006 | Chaganty et al. ............ 726/11 |
| 7,924,730 B1* | 4/2011 | McAllister et al. .......... 370/248 |
| 8,717,888 B2* | 5/2014 | Sankar et al. ............... 370/230 |
| 2002/0023150 A1* | 2/2002 | Osafune et al. ............. 709/221 |
| 2002/0052972 A1* | 5/2002 | Yim ............................ 709/245 |
| 2003/0067924 A1* | 4/2003 | Choe et al. .................. 370/400 |
| 2005/0102384 A1* | 5/2005 | Ueno et al. .................. 709/223 |
| 2013/0094357 A1* | 4/2013 | Sankar et al. ............... 370/230 |

* cited by examiner

PERFORMING FAILOVER IN A REDUNDANCY GROUP

PRIORITY CLAIM

The present application is a continuation of U.S. patent application Ser. No. 14/083,351, titled "Performing Failover in a Redundancy Group," filed on Nov. 18, 2013, which also claims benefit of priority from Taiwan Patent Application 101143054, filed on Nov. 19, 2012. The contents of each application is incorporated by reference herein.

BACKGROUND

1. Technical Field

The present disclosure relates to providing redundancy of routers in a network environment. More specifically, the present disclosure relates to a method, apparatus, and computer program product for performing zero-down-time failover in a network system of a redundancy group comprising redundant or standby apparatuses operable together.

2. Description of the Related Art

Local area networks (LANs) are usually connected to other (LANs) or extranets via one or more routers or Internet appliances which enable intercommunication between hosts (i.e., client end computers disposed on a LAN, such as a personal computer) on different LANs, since a host can only communicate directly with the network entities on a segment of the LAN of the host.

Unlike general-purpose computer devices, an internet appliance is typically designed to serve a specific purpose and/or provide a specific service. Compared to a typical general-purpose computer device, internet appliances are relatively "closed"—their specific operating systems and applications (or drivers) vary with their intended purposes and services. For example, please refer to IBM® WebSphere® DataPower Series SOA Appliances or Tivoli® ISS Appliances® ("IBM," "WebSphere," and "Tivoli" are registered trademarks in the possession of International Business Machine in the United States and/or other countries). In addition to having routing functions, an information appliance may also provide network-attached storage.

Unfortunately, failure of a router, including rebooting and scheduled maintenance, is likely to paralyze a network in its entirety. In response, a number of different First Hop Redundancy Protocols (FHRP) capable of performing failover have been developed to cope with router failure and to minimize down time before networking functionality is restored. For example, Cisco Systems, Inc. offers Hot Standby Router Protocol (HSRP), Virtual Router Redundancy Protocol (VRRP), and Gateway Load Balancing Protocol (GLBP). Hot Standby Router Protocol (HSRP) is dedicated to support a redundancy protocol of the system undergoing failover, and is described in detail in RFC 2281 (see also U.S. Pat. Nos. 5,473,599 and 7,152,179). The HSRP dedicated protocol enables a network engineer to position a plurality of redundant routers in the same subnet in a manner that each of the redundant routers functions as a subnet router (gateway). To use the HSRP, it is necessary that routers (gateways) are arranged together to form a virtual network entity (virtual router), such that a virtual IP address and a virtual MAC address of the HSRP are created for use by the virtual router. The routers are hereunder collectively known as a "redundancy group or standby group". As different routers are configured in accordance with the HSRP, a single primary active router is adapted to serve a communication purpose and selected. The active router maps itself to the virtual router and fully represents the virtual router in processing traffic flow. Additionally, a single standby router is also selected based on pre-configured priority or any other appropriate rules. When configured in accordance with the HSRP, a passive router is linked to a segment or to segments served by an active router and is designated to function as a backup apparatus for the active router. Hence, the active router and the passive router share the virtual IP address and the virtual MAC address (each instance is restricted to a router).

Figure 1:
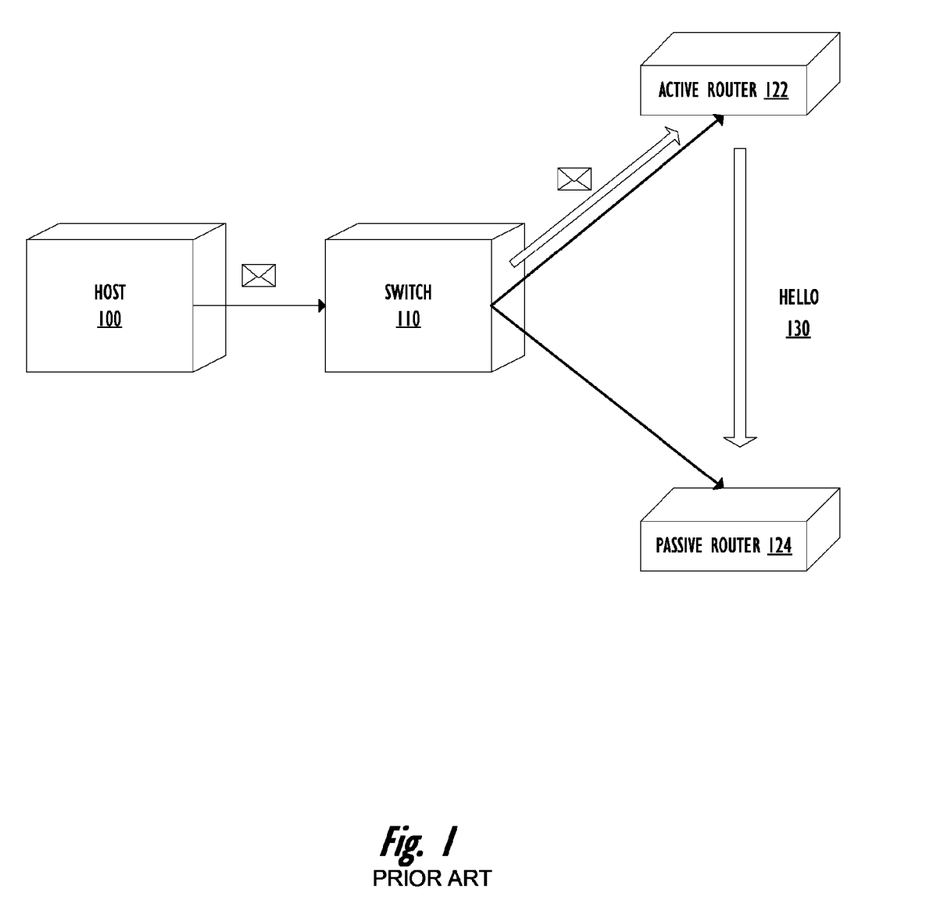
FIG. 1 is a block diagram of a conventional HSRP configuration that comprises an active router and a standby router according to the prior art.

The prior art embodiment depicted in FIG. 1 comprises only one host 100, a switch 110, and a redundant or standby group 120 of an active router 122 and a passive router 124. The passive router 124 within the same standby group 120, periodically receives a "Hello" message 130 sent from active router 122, so as to test whether the active router 122 has failed. However, the switch 110 of each of the failover mechanisms provided by the various First Hop Redundancy Protocols (FHRP) known in the prior art, in response to receiving an incoming message, forwards the message to the active router 122 currently representing the virtual router. If the active router 122 fails or is otherwise "down", there is a significant time lag before the passive router replaces the failed active router. The time lag lasts for seconds and is known as a black hole. The black hole starts from the point in time when the active router fails and ends at the point in time when the passive router detects a failed active router. As a result, many messages are missed out during the black hole which is likely to greatly impact mission-critical information appliances or applications (such as stock trading.)

BRIEF SUMMARY

Disclosed is a method, system, and computer program product for performing failover in a redundancy group comprising a plurality of routers, the failover being characterized by zero black hole or significantly reduced black hole conditions versus a conventional failover system. According to the present disclosure, every time a switch receives an incoming message, the switch sends an ARP request by broadcast to each of the routers in a standby group to thereby resolve the virtual MAC address corresponding to the virtual IP address of the virtual router representing the standby group. The message is a packet, a Transmission Control Protocol stream (TCP stream), or a transaction. As soon as the active router receives the ARP request, the active router not only sends an ARP reply to provide the "virtual MAC address" of the virtual router in response to the ARP request, but also sends the "Hello" message to a standby router within a same standby group to thereby inform that standby router that the ARP request has been replied by the active router. After receiving the ARP reply, the switch forwards the incoming message to the active router for determining a route. After receiving the ARP request, the standby router boots a holdtime timer to wait for the "Hello" message sent from the active router. If the standby router receives the "Hello" message before the holdtime timer expires, the standby router will remain in the standby state, with the holdtime timer rebooted. If the standby router has not yet received the "Hello" message before the holdtime timer expires, the standby router will not only infer that the active router has failed (or is otherwise "down") and enter the active state to become a new active router, but also sends the ARP reply in response to the ARP request to provide the "virtual MAC address" of the virtual router. After receiving the ARP reply from the standby router, the switch forwards the incoming message to the standby router, which has become the new active router, for determining a route.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate by way of example preferred embodiments of the present disclosure and explain principles and advantages of the present disclosure.

DETAILED DESCRIPTION OF AN ILLUSTRATIVE EMBODIMENT

Described herein is a system, method, and computer program product for performing a zero-down-time failover in a network system using a redundancy group. Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Any reference throughout this specification to "one embodiment," "an embodiment," or similar language indicates only that a particular feature, structure, or characteristic described in connection with the embodiment is included in at least one embodiment of the present disclosure. Thus, appearances of such phrases as "in one embodiment", "in an embodiment", and similar language throughout this specification may, but do not necessarily, all refer to the same embodiment.

As will be appreciated by one skilled in the art, the present disclosure may be embodied as an information appliance, data processing system, a method, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium. It will be understood by those skilled in the art that the apparatus that embodies a part or all of the present disclosure may be a general purpose device having at least one processing unit, a memory, and a software executing on the at least one processing unit that is further configured to provide a part or all of an embodiment of the disclosure. The device may be a single device or a group of devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 2 through FIG. 5, systems, methods, and computer program products are illustrated as structural or functional block diagrams or process flowcharts according to various embodiments of the present disclosure. The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
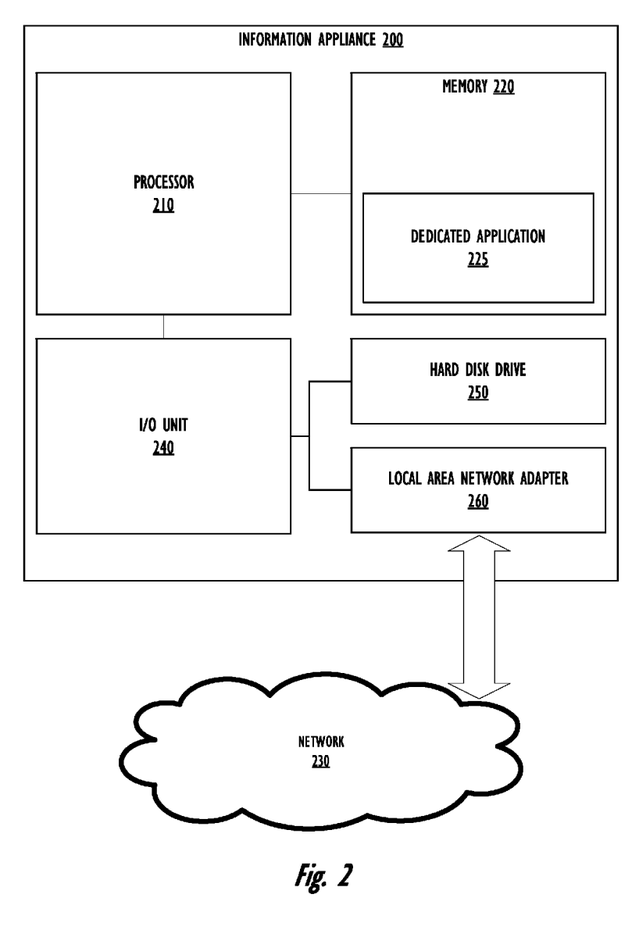
FIG. 2 is a block diagram of a hardware environment of an information appliance that functions as a switch or a router according to an illustrative embodiment of the present disclosure.

Referring now to FIG. 2, there is illustrated a block diagram of a hardware environment of an information appliance for functioning as a switch or a router according to an illustrative embodiment of the present disclosure. A router (or a gateway) is a hardware apparatus operating on a network layer and adapted to determine a route (delivery path) for delivering packets across a LAN or a wide area network (WAN) under a network architecture. The router is also known as layer 3 apparatus. A router may also be implemented in the form of an information appliance (also known as an Internet appliance) having built-in networking capability functions. In an embodiment, the hardware framework of the appliances is similar to that of IBM WebSphere DataPower Series SOA Appliances or Tivoli ISS Appliances.

Information appliance 200 comprises a processor(s) 210, a memory 220, and an input/output (I/O) unit 240. I/O unit 240 may further include an I/O bus (not pictured) that is a high-speed serial bus, such as a PCI-e bus, or any other bus structure. I/O unit 240 may also connect directly to various components or may be interconnected to other components/ systems by means of an additional card. I/O unit 240 can also be coupled to a hard disk drive 250 or a local area network (LAN) adapter 260. Using LAN adapter 260, information appliance 200 communicates with another computer (not pictured) via network 230. Network 230 may be connected to information appliance 200 via a connection of any type, including, but not limited to, a wide area network (WAN) or a local area network (LAN) with static IP, or a temporary connection to the Internet through an Internet service provider (ISP) via a cable connection or wireless connection. Persons skilled in the art are able to understand that the network can also have other hardware and software elements (such as an additional computer system, a router, or a firewall) not shown in the accompanying drawings. Memory 220 is a random access memory (RAM), a read-only memory (ROM), or an erasable programmable read-only memory (EPROM or Flash memory). Memory 220 stores an operating system, a program code of a dedicated application 225, and optionally various additional information/data. Processor 210 accesses the memory 220 so as to execute dedicated application 225. An operating system is executed on processor 210 to coordinate and provide control of the various components of information appliance 200.

According to one embodiment, information appliance 200 functions as a switch to route client end message received from one or more linked hosts, and a connected router determines a route whereby the router communicates with other hosts (or network entities) of other LANs or extranets. In this embodiment of information appliance 200, the switch functions are provided in the form of a dedicated application 225 including a "switch processing module". According to one embodiment, information appliance 200 functions as a router to determine a route whereby the router communicates with other hosts (or network entities) of other LANs or extranets and forwards a received client end message to the other hosts (or other network entities). In this embodiment, the router functions are provided in the form of dedicated application 225 including an "active router and standby router processing module" of the present disclosure.

The "switch processing module" and the "active router and standby router processing module" further include program modules and instructions. The program modules and instructions are for use in performing failover characterized by zero down time in a network system of a redundancy group including redundant and standby apparatuses operating in conjunction. The processing modules are built in applications or implemented in the form of daemons. However, in other embodiments, the processing modules come in the form of programs presented in other formats. The processing modules include a program code for implementing the solution illustrated with FIGS. 4 and 5.

Persons skilled in the art understand that the hardware of the information appliance 200 in FIG. 2 may vary and can be supplemented by or replaced with, for example, other internal hardware, such a flash ROM or non-volatile memory, or other peripheral apparatuses such as a CD-ROM.

Figure 3A:
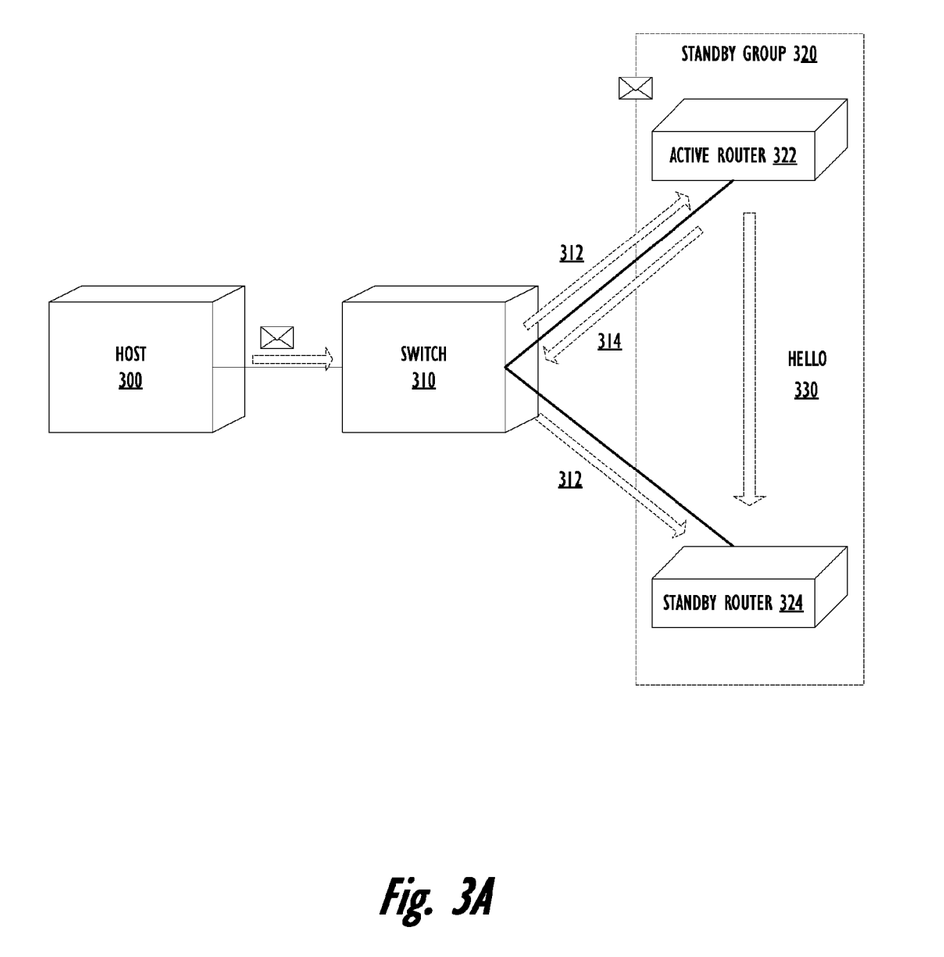
FIG. 3A is a block diagram of operation of a network system having an alive current active router according to an embodiment of the present disclosure.

Referring to FIG. 3A, there is illustrated a block diagram of operation of a network system having an alive current active router (a current active router functioning normally), according to an embodiment of the present disclosure. Assuming that both active router 322 and the standby router 324 are alive (functioning normally), as soon as switch 310 receives an incoming message in each instance, switch 310 sends, through broadcast, an ARP request 312 to each of the routers in standby group 320 to resolve a virtual MAC address corresponding to a virtual IP address of a virtual router that is operating as a current active router and is thus currently representing standby group 320. As soon as active router 322 receives the ARP request 312, active router 322 sends (1) an ARP reply 314 in response to ARP request 312 that provides the "virtual MAC address" of the virtual router to switch 310, and active router 322 also sends (2) a "Hello" message 330 to standby router(s) 324 within a same standby group 320 to thereby inform standby router(s) 324 that active router 322 has replied to the ARP request 312, thereby ensuring that only one router replies. After receiving the ARP reply 314, switch 310 forwards the incoming message to active router 322 to determine a route. The message includes, but is not limited to, a packet, a Transmission Control Protocol (TCP) stream, or a transaction.

After receiving the ARP request 312, standby router 324 reboots/resets a holdtime timer (not shown) to wait for "Hello" message 330 sent from the active router. The holdtime timer is set to 10 seconds, and the cycle of the "Hello" message is set to 3 seconds. Thus, if standby router 324 receives the "Hello" message 330 before the holdtime timer expires, standby router 324 will remain in the standby state, with the holdtime timer rebooted.

Figure 3B:
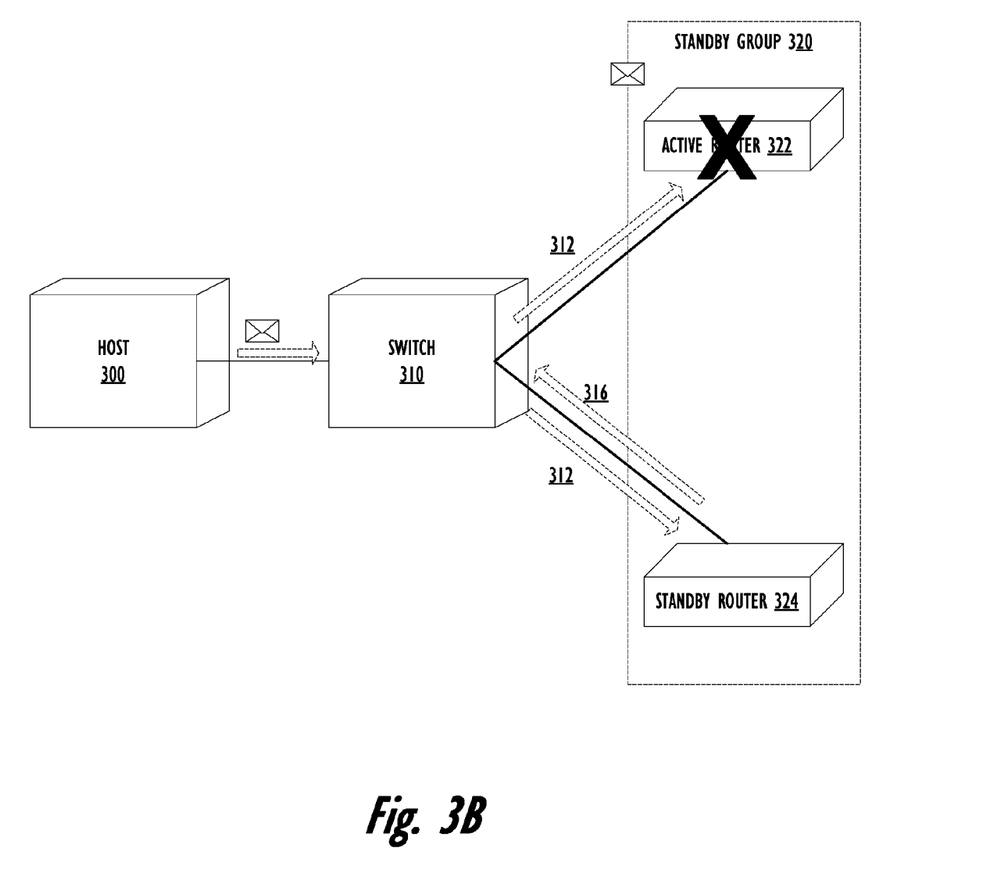
FIG. 3B is a block diagram of operation of a network system during failure of an active router according to an embodiment of the present disclosure.

Referring to FIG. 3B, there is illustrated a block diagram of operation of a network system performing failover during failure of a current active router, according to an embodiment of the present disclosure. If standby router 324 has not yet received "Hello" message 330 before the holdtime timer expires, standby router 324 will automatically infer that active router 322 has failed (or is otherwise "down") and enters an active state to become the new active router. Furthermore, in response to the ARP request 312, ARP reply 316 is sent back to switch 310 to provide the "virtual MAC address" of standby router 324 which will function as the new virtual router. After receiving ARP reply 316, switch 310 forwards the incoming message to standby router 324 (i.e., the new active router) to determine a route. If standby group 320 comprises at least one other standby router, the new active router will send the "Hello" message 330 to all other standby routers in the same standby group 320.

Figure 4:
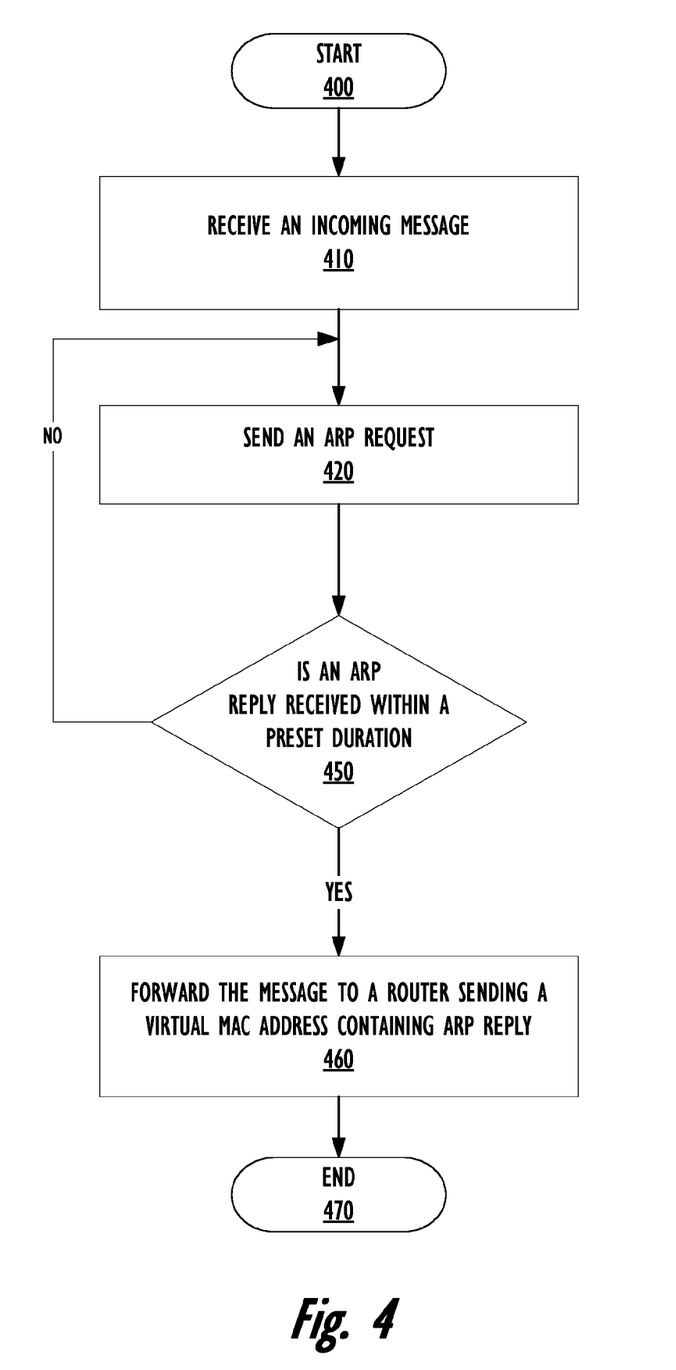
FIG. 4 is a flow diagram of a method for using a switch processing module according to an embodiment of the present disclosure.

Referring to FIG. 4, there is illustrated a flow diagram of a method for using a switch processing module according to an embodiment of the present disclosure. At step 410 switch 310 receives an incoming message from a host. At step 420 an ARP request is sent via broadcast to each of the routers in the standby group 320. This request is sent to resolve a virtual MAC address corresponding to a virtual IP address of the virtual router that is currently representing the standby group (the current active router) in order to identify the current active router. According to one embodiment of the present disclosure, switch 310 is characterized such that a router which sends a virtual MAC address-containing ARP reply represents the actual active router of the virtual router.

At step 450, switch 310 determines whether an ARP reply is received from either the current active router (ARP reply 314) or from a standby router from the standby group 320 (ARP reply 316) within a preset duration of time (block 450). If the determination is negative, the ARP request will be sent again. In response to determining an ARP reply has been received within the preset duration of time, the incoming message will be forwarded to the router sending the ARP reply, which contains a virtual MAC address, to thereby determine a route (step 460). The occurrence of an ARP reply from the standby router 324 indicates that the active router 322 has failed. In this event, the standby router (e.g. standby router 324) thereby becomes the new active router and represents the virtual router, and the standby router thus forwards the message to the standby router 324 to determine a route. The process then terminates at step 470.

Figure 5:
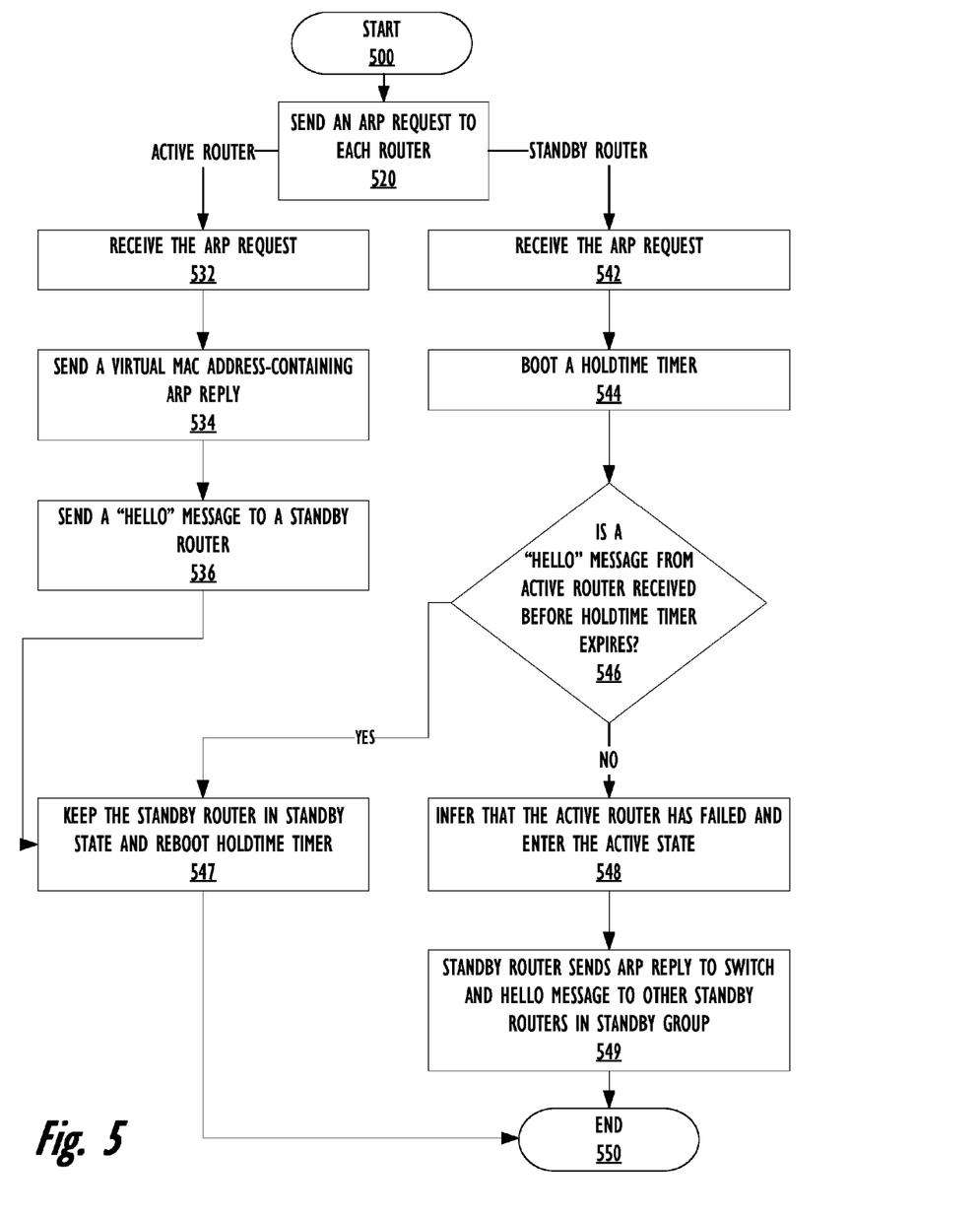
FIG. 5 is a flow diagram of a method for processing an address resolution protocol (ARP) request by an active router and a standby router according to an embodiment of the present disclosure.

Referring to FIG. 5, there is illustrated a flow diagram of a method for processing an address resolution protocol (ARP) request by an active router and a standby router according to an embodiment of the present disclosure. In response to a switch receiving an incoming message from a host, at step 420 the switch sends an ARP request to each of the routers in a standby group.

At step 532, the active router receives the ARP request from the switch. The active router then sends an ARP reply to the switch to provide a "virtual MAC address" of the virtual router (step 534). The active router then sends a "Hello" message to the standby router(s) within the same standby group (e.g. standby group 320) to inform each of the standby routers that the active router has replied to the ARP request. At step 547 the standby router(s) receive the "Hello" message and reboots their respective holdtime timer(s). The process for the active router then terminates at step 550.

At step 542, a standby router receives the ARP request from the switch. In response to receiving the ARP request the receiving standby router boots/starts a holdtime timer to wait for a "Hello" message from the active router. At step 546, the standby router determines whether the "Hello" message from the active router has been received before the holdtime timer expires. If the standby router determines the "Hello" message has been received before the holdtime timer expired, the standby router remains in the standby state and reboots the holdtime timer.

However, if the standby router determines the "Hello" message has not been received before the holdtime timer expired, the standby router will automatically infer that the active router has failed and enters an active state to become the new active router and thus assume the duty of the virtual router (step 548). The standby router then sends an ARP reply to provide a "virtual MAC address" of the virtual router to the switch. The ARP reply from the standby router ARP reply indicates to the switch that the active router representing the virtual router has been changed to the standby router sending the ARP reply. Simultaneously, the standby router also sends the "Hello" message to any other standby routers in the same standby group. The process then terminates at step 550.

According to the present disclosure, after receiving an incoming message in each instance, the switch sends an ARP request through broadcast to identify the current active router. After identifying the actual router representing the virtual router, the switch forwards the incoming message. Once an active router fails, a standby router will immediately take on the duty of being the active router. If an active router fails, the switch will forward the incoming message only after receiving an ARP reply and identifying the actual router representing the virtual router. Thus, unless the new active router fails while forwarding the incoming message, message omission cannot occur. Even in such an event, only the received message will be missed, and a resultant time lag will be much shorter than a conventional black hole which usually lasts for several seconds.

To enhance the forwarding efficiency of the present disclosure, the message may be in the form of a packet, a Transmission Control Protocol (TCP) stream, or a transaction. For example, sending the message as a TCP stream will manifest higher efficiency than sending a packet normally, provided that the switch supports an address resolution mechanism for the TCP stream. Although the above embodiment of the present disclosure is described from the perspective of a Hot Standby Router Protocol (HSRP), the present disclosure is not limited thereto. In other embodiments, the present disclosure applies other different First Hop Redundancy Protocols (FHRP), such as information appliances or systems of Virtual Router Redundancy Protocols (VRRP) and Gateway Load Balancing Protocols (GLBP).

According to an embodiment of the present disclosure, there is provided a method for performing failover in a redundancy group, where the redundancy group comprises a plurality of routers, including a current active router and a standby router. The method comprises the steps of: receiving an incoming message at a switch; sending a request of identification to the plurality of routers to identify a current active router, where the current active router represents a virtual router of the redundancy group; and in response to receiving a reply containing an identification from the current active router within a predetermined time, forwarding the incoming message to the current active router.

According to an embodiment of the present disclosure, there is provided a method for performing failover in a redundancy group, where the redundancy group comprises a plurality of routers including a current active router and a standby router. The method comprises the steps of: receiving a request of identification from a switch, where the request of identification is intended to identify a current active router representing a virtual router of the redundancy group; sending a reply containing an identifier of the current active router; and sending a notice message to other standby routers within the redundancy group to declare to the other standby routers that the active router has replied to the request of identification.

According to an embodiment of the present disclosure, there is provided a method for performing failover in a redundancy group, wherein the redundancy group comprises a plurality of routers, including a current active router and a standby router. The method comprises the steps of: receiving a request of identification from a switch, wherein the request of identification is intended to identify a current active router representing a virtual router of the redundancy group; booting a holdtime timer, and waiting for a notice message sent from the active router, wherein, if the standby router has not yet received the notice message before the holdtime timer expires, the standby router will enter an active state to become the new active router which represents the virtual router, and wherein, in response to the request of identification, the standby router sends a reply containing an identifier of the standby router to declare to the switch and any other standby routers that that the standby router currently represents the virtual router and thus is the new active router.

The present disclosure further provides in one embodiment a computer program product comprising a computer-readable medium having a program code stored therein and executed on a processor of a data processing system such as an information appliance to implement any of the aforesaid methods, thereby performing failover in a redundancy group.

According to another embodiment of the present disclosure, an information appliance comprises: a bus; a memory connected to the bus and comprising a plurality of instructions; a processing unit connected to the bus and adapted to execute the plurality of instructions, so as to execute any of the aforesaid methods, thereby performing failover in a redundancy group.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

While the present disclosure has been described with reference to exemplary embodiments, and while the embodiments have been described in considerable detail, it will be understood by those skilled in the art that various changes may be made and equivalents may be substituted for elements thereof without departing from the scope of the disclosure. Additional advantages and modifications will readily appear to those skilled in the art. The description of the present disclosure has been presented for purposes of illustration and description, but is not intended to be exhaustive or limited to the disclosure in the form disclosed. Many improvements, modifications, and variations will be apparent to those of ordinary skill in the art without departing from the scope and spirit of the present disclosure. In addition, many modifications may be made to adapt a particular system, device or component thereof to the teachings of the disclosure without departing from the essential scope thereof. The embodiment was chosen and described in order to best explain the principles of the disclosure and the practical application, and to enable others of ordinary skill in the art to understand the disclosure for various embodiments with various modifications as are suited to the particular use contemplated. Therefore, it is intended that the disclosure not be limited to the particular embodiments disclosed for carrying out this disclosure, but that the disclosure will include all embodiments falling within the scope of the appended claims.

What is claimed is:

1. A method for performing failover in a redundancy group, wherein the redundancy group comprises a plurality of routers including a current active router and a standby router, the method comprising the steps of:
   a switch receiving an incoming message;
   in response to receiving the incoming message, the switch sending a request of identification to each router of the plurality of routers in the redundancy group to identify a current active router and to prevent a black hole condition in the redundancy group, wherein the black hole condition is a period of time between when an active router fails and a passive router replaces the active router during which one or more messages sent by the switch are not received, wherein the current active router represents a virtual router of the redundancy group, wherein the switch sends the request of identification to each of the plurality of routers in the redundancy group responsive to each instance of receiving an incoming message; and
   in response to receiving a reply containing an identification from the current active router within a predetermined time, forwarding the incoming message to the current active router, wherein the switch only forwards the incoming message after receiving the reply;
   wherein the switch is located external to the redundancy group.

2. The method of claim 1, wherein the sending the request of identification further comprises:
   sending an address resolution protocol (ARP) request to resolve a virtual MAC address corresponding to a virtual IP address of the virtual router;
   wherein the reply is an ARP reply comprising the virtual MAC address.

3. The method of claim 2, further comprising, in response to not receiving the reply within the predetermined time, resending the ARP request.

4. The method of claim 2, wherein the redundancy group is one of a Hot Standby Router Protocol (HSRP) group and a Virtual Router Redundancy Protocol (VRRP) group.

5. The method of claim 2, wherein the incoming message is at least one of: a packet, a Transmission Control Protocol (TCP) stream, and a transaction.

6. The method of claim 1, wherein in response to the current active router receiving the request of identification, the current active router performs a method comprising:
   sending the reply containing the identification to the sender of the request of identification; and
   sending a notice message to the standby router that declares to the standby router that the current active router has replied to the request of identification.

7. The method of claim 6, wherein the request of identification is an address resolution protocol (ARP) request for resolving a virtual MAC address corresponding to a virtual IP address of the virtual router, and wherein the reply is an ARP reply that comprises the virtual MAC address.

8. The method of claim 7, wherein the notice message is a "Hello" message that is multicast to the plurality of routers in the redundancy group.

9. The method of claim 6, wherein in response to the standby router receiving the request of identification, the standby router:
   boots a holdtime timer;
   waits to receive the notice message from the current active router;
   in response to the holdtime timer expiring before receiving the notice message from the current active router, the standby router:
      enters an active state to become the current active router of the redundancy group; and
      sends the reply containing the identification to the sender of the request of identification, wherein the reply declares that the standby router currently represents the virtual router and is the current active router of the redundancy group; and
   in response to the standby router receiving the notice message from the current active router before the holdtime timer expires:
      maintains a standby state as a standby router of the redundancy group; and
      reboots the holdtime timer.

10. The method of claim 9, wherein in response to the standby router entering an active state to become the current active router of the redundancy group, the standby router sends a second notice message to any other standby routers within the redundancy group that declares to the other standby routers that the current active router has replied to the request of identification.

* * * * *